July 20, 1965  F. M. POTTER ETAL  3,196,317
HEATSINKS AND RECTIFIER ASSEMBLY FOR A DYNAMOELECTRIC MACHINE
Filed Feb. 19, 1963
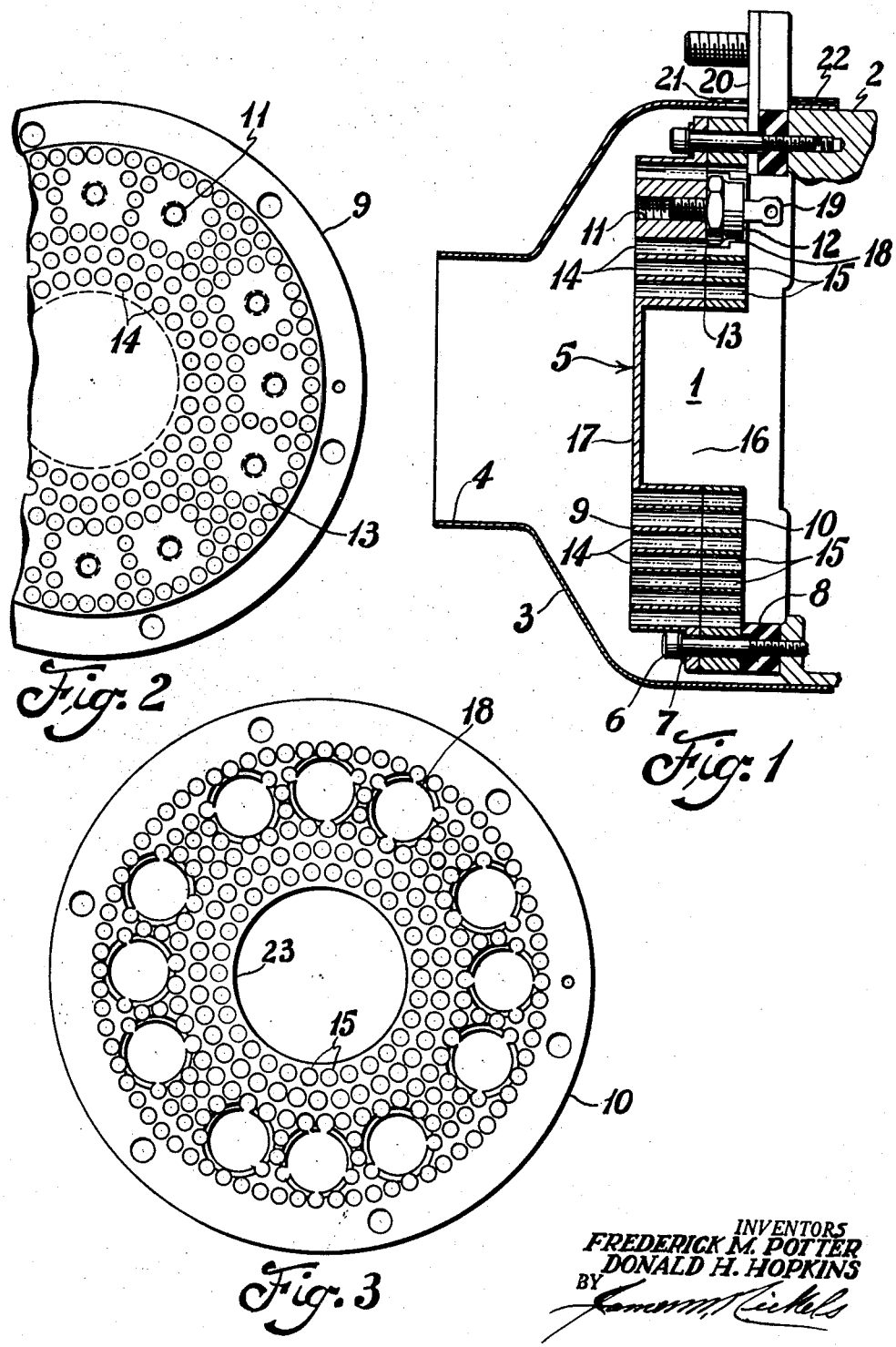
INVENTORS
FREDERICK M. POTTER
DONALD H. HOPKINS
BY
ATTORNEY United States Patent Office 3,196,317
Patented July 20, 1965

3,196,317
HEATSINKS AND RECTIFIER ASSEMBLY FOR A DYNAMOELECTRIC MACHINE
Frederick Milton Potter, Little Silver, and Donald Henry Hopkins, Oakhurst, N.J., assignors to The Bendix Corporation, Eatontown, N.J., a corporation of Delaware
Filed Feb. 19, 1963, Ser. No. 259,629
2 Claims. (Cl. 317—100)

The present invention relates to heatsinks and more particularly to heatsinks for a dynamoelectric machine.

In brushless D.C. generators, rectifiers are used to rectify the output from an A.C. stator. Heretofore it has been the practice to mount the rectifiers on a copper ring which is located in the end of the generator. Inasmuch as it is necessary that the copper ring be insulated from the generator housing, it is not adequate to remove the heat from the rectifiers.

The present invention provides improved means for mounting the rectifiers in the end of the generator which provides adequate cooling surfaces for dissipating the heat from the rectifiers. Further, the construction is such that there is no impairment of the normal cooling air required by the generator.

It is an object of the invention to provide an improved dynamoelectric machine.

Another object of the invention is to provide improved means for dissipating heat in a dynamoelectric machine.

Another object of the invention is to provide an improved heat exchanger.

Another object of the invention is to provide improved means for mounting rectifiers.

Another object of the invention is to provide novel means for mounting rectifiers in a dynamoelectric machine.

The above and other objects and features of the invention will appear more fully hereinafter from a consideration of the following description taken in connection with the accompanying drawing wherein one embodiment is illustrated by way of example.

In the drawing:

FIGURE 1 is a sectional view of the end section of a dynamoelectric machine incorporating a heat exchanger embodying the invention.

FIGURE 2 is an end view of one section of the heat exchanger of FIGURE 1.

FIGURE 3 is an end view of the other section of the heat exchanger of FIGURE 1.

Referring now to the drawing, a dynamoelectric machine is indicated generally by the numeral 1, only a portion thereof is illustrated, which may be, for example, a brushless D.C. generator. The machine 1 includes a housing 2 which has an air spout 3 secured thereto in a conventional manner. The air spout 3 has a reduced section 4 adapted to be fitted to a source of cooling air (not illustrated).

A heat exchanger 5 is secured to and insulated from the housing by bolts 6, insulators 7 and 8. The heat exchanger or heat sink 5 may be made of aluminum or other suitable material and is made into two parts, a base or mounting plate 9 and a cover or top plate 10. The base plate 9 has a plurality of holes 11 which are tapped for mounting rectifiers 12. The specific arrangement illustrated is for a 12 phase rectifier connection employing interphase transformers, hence, the heatsink 5 illustrates provision for mounting 12 rectifiers or diodes 12. The face of the plate 9 upon which the rectifiers 12 are mounted is provided with a very flat surface which has a plating 13 thereon. The plating 13 may be of silver or other metal that has good heat and electrical conductivity.

Also, the plating 13 prevents the forming of an aluminum oxide film on the plate 9 and thereby prevents forming an insulation between the plates 9 and 10. A plurality of holes or openings 14 having a diameter less than the thickness of the plate 9 are spaced in the plate 9 and positioned for alignment with corresponding holes 15 in the plate 10. The plate 9 has a counterbore section 16 which has a solid wall 17 enclosing the bottom thereof.

The plate 10, in addition to the holes 15, has opening 18 adapted for positioning in alignment with the rectifiers 12 so that input terminals 19 of the rectifiers 12 extend therethrough. An output terminal 20 is secured to the plate 10 by means of screws or any other suitable means. Insulators 21 and 22 insulate the terminal 20 from the housing 2. An opening 23 in the plate 10 is concentric with the counterbore section 16.

A novel feature of the heatsink design is that it provides a very large amount of surface area for the cooling air to contact with sufficient material between the diodes and the cooling surface. Sufficient hole area is provided so that the normal cooling air required by the generator is not impaired. By having the heatsink of a certain thickness, the cooling air holes are longer than the diameter of the holes, thus permitting a recovery of pressure and a straightening of the air flow to a point where the restriction to air flow is less than that of a thin screen of the same total opening.

While the embodiment described has used aluminum as the material for the heatsink, it is understood that other suitable materials may be used. Aluminum was selected not only for its heat conductivity but for weight. While copper would be an ideal material, the extra weight over aluminum would not be justified for aircraft use.

For full wave, three phase rectification, the heatsink would be split into two pieces and insulated from each other. Three rectifiers of one polarity would be mounted on one section and three rectifiers of the opposite polarity on the other.

By having the heatsink made up of the two plates 9 and 10, makes it possible to have more cooling surfaces into closer position to the rectifiers 12. However, in some applications where the heat problem is not too severe, only the bottom plate 9 may be used.

Although only one embodiment of the invention has been illustrated and described, various changes in the form and relative arrangements of the parts, which will now appear to those skilled in the art, may be made without departing from the scope of the invention.

What is claimed is:

1. A heatsink and rectifier assembly for a dynamoelectric machine comprising a metallic aluminum base plate, a plurality of rectifiers mounted in intimate contact on said base plate, a plurality of openings extending through said base plate and being of a diameter less than the thickness of said base plate, an aluminum top plate having counterbore sections fitted over said rectifiers, a plurality of openings in alignment with the openings in said base plate, and means securing said plates together in intimate contact.

2. An assembly as set forth in claim 1 in which the face of said base plae which is in contact with said face plate has a plating of silver thereon.

References Cited by the Examiner
UNITED STATES PATENTS

| | | | |
|---|---|---|---|
| 2,815,472 | 12/57 | Jackson et al. | 174—15 |
| 2,836,772 | 5/58 | Wintrode et al. | 317—100 X |
| 3,054,032 | 9/62 | Sabins | 165—47 X |

DARRELL L. CLAY, Primary Examiner.

JOHN P. WILDMAN, E. JAMES SAX, Examiners.